(12) United States Patent  (10) Patent No.: US 8,515,795 B2
Marrelli et al.  (45) Date of Patent: Aug. 20, 2013

(54) CREATING A DATA GOVERNANCE ASSESSMENT

(75) Inventors: Carl M. Marrelli, Westerville, OH (US);
Ram S. Narayanan, Canton, MI (US);
Martin Oberhofer, Bondorf (DE);
Solmaz Rashidi, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 13/190,902

(22) Filed: Jul. 26, 2011

(65) Prior Publication Data

US 2013/0030850 A1 Jan. 31, 2013

(51) Int. Cl.
*G06Q 40/00* (2012.01)

(52) U.S. Cl.
USPC ........................................ 705/7.11; 705/7.42

(58) Field of Classification Search
USPC ............................... 705/7.11, 7.42
See application file for complete search history.

(56) References Cited

U.S. PATENT DOCUMENTS

| | | | |
|---|---|---|---|
| 7,925,594 B2 | 4/2011 | Jaligama et al. | |
| 8,019,632 B2 * | 9/2011 | Niheu et al. | 705/7.11 |
| 2004/0177335 A1 * | 9/2004 | Beisiegel et al. | 717/102 |
| 2004/0193703 A1 * | 9/2004 | Loewy et al. | 709/220 |
| 2006/0235733 A1 * | 10/2006 | Marks | 705/7 |
| 2008/0059520 A1 | 3/2008 | Moss | |
| 2008/0154695 A1 | 6/2008 | Wolfe et al. | |
| 2008/0249825 A1 | 10/2008 | Kunjur et al. | |
| 2008/0270153 A1 * | 10/2008 | Drapkin et al. | 705/1 |
| 2008/0270197 A1 | 10/2008 | Rafter et al. | |
| 2008/0288313 A1 | 11/2008 | Morris et al. | |
| 2009/0064087 A1 | 3/2009 | Isom | |
| 2009/0112644 A1 * | 4/2009 | Isom | 705/7 |
| 2009/0119141 A1 | 5/2009 | McCalmont et al. | |
| 2009/0177665 A1 | 7/2009 | Callery et al. | |
| 2009/0228337 A1 | 9/2009 | Swindon et al. | |
| 2009/0265209 A1 | 10/2009 | Swaminathan et al. | |
| 2010/0131326 A1 * | 5/2010 | Channabasavaiah et al. | 705/9 |
| 2010/0217632 A1 * | 8/2010 | Channabasavaiah et al. | 705/7 |
| 2010/0228587 A1 * | 9/2010 | Channabasavaiah et al. | 705/8 |
| 2010/0250295 A1 * | 9/2010 | Channabasavaiah et al. | 705/7 |
| 2010/0250298 A1 * | 9/2010 | Channabasavaiah et al. | 705/7 |
| 2010/0250299 A1 * | 9/2010 | Channabasavaiah et al. | 705/7 |
| 2010/0250316 A1 * | 9/2010 | Channabasavaiah et al. | 705/8 |
| 2010/0250320 A1 * | 9/2010 | Channabasavaiah et al. | 705/9 |
| 2010/0257010 A1 * | 10/2010 | Allam et al. | 705/8 |
| 2010/0280856 A1 * | 11/2010 | Channabasavaiah et al. | 705/7 |
| 2011/0010217 A1 * | 1/2011 | Arni et al. | 705/8 |
| 2011/0022439 A1 * | 1/2011 | Arni et al. | 705/9 |
| 2011/0320238 A1 * | 12/2011 | Niheu et al. | 705/7.24 |

OTHER PUBLICATIONS

Kalido Launches Data Governance Maturity Assessment to Benchmark and Advance Data Governance Programs, Marketwire, Burlington, MA, Oct. 9, 2010 http://www.freshnews.com/news/379120/kalido-launches-data-governance-maturity-assessment-benchmark-and-advance-data-governan.

* cited by examiner

*Primary Examiner* — Thomas Dixon
*Assistant Examiner* — Benjamin S Fields
(74) *Attorney, Agent, or Firm* — Kunzler Law Group, PC (57) ABSTRACT

For creating a data governance assessment, a response module receives responses to an automated questionnaire. A scoring module computes a data governance assessment comprising a maturity level describing organizational adoption of data governance, a data governance model describing a data centralization level, and a framework describing a tier of data governance by calculating the maturity level, the data governance model, and the framework from the responses.

25 Claims, 6 Drawing Sheets

Prior Art

CREATING A DATA GOVERNANCE ASSESSMENT

FIELD

The subject matter disclosed herein relates to data governance and more particularly relates to creating a data governance assessment.

BACKGROUND

Description of the Related Art

Business enterprises tend to have lots of data, such as, for example, data about accounting, finances, contracts, customers, inventory, products, services, workflow, development, etc. In order to make effective use of such data, enterprises need policies and procedures for governing the data. In order to determine effectiveness of data governance, enterprises assess data governance from time to time.

BRIEF SUMMARY

A method for creating a data governance assessment is disclosed. A response module receives responses to an automated questionnaire. A scoring module computes a data governance assessment comprising a maturity level describing organizational adoption of data governance, a data governance model describing a data centralization level, and a framework describing a tier of data governance by calculating the maturity level, the data governance model, and the framework from the responses. An apparatus and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
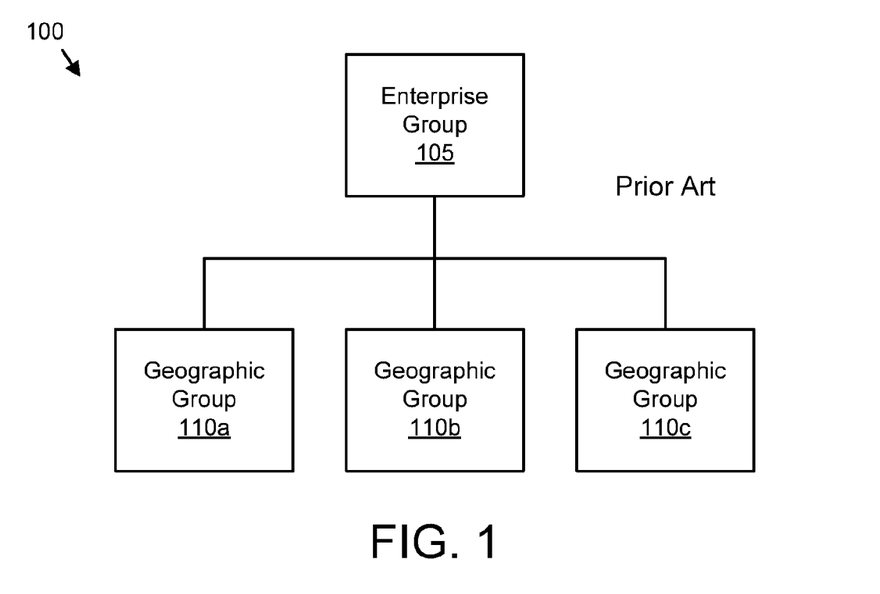
FIG. 1 is a schematic block diagram illustrating one embodiment of an organization.

FIG. 1 is a schematic block diagram illustrating one embodiment of an organization 100. The organization 100 includes an enterprise group 105 and one or more geographic groups 110. The enterprise group 105 may comprise one or more headquarters Information Technology (IT) functions. The enterprise group 105 may be organizationally centralized. Alternatively, the enterprise group 105 may be physically centralized.

The geographic groups 110 may comprise local offices, national units of an international corporation, divisions, semi-autonomous organizations, and the like. In the past, the organization 100 may have employed one or more subject matter experts to develop a data governance model and framework for the organization 100. However, the subject matter experts have employed methodologies that are inconsistent when gathering information to determine the data governance model and framework. The embodiments described hereafter consistently and reliably create a data governance assessment with a data governance model and framework.

Figure 2:
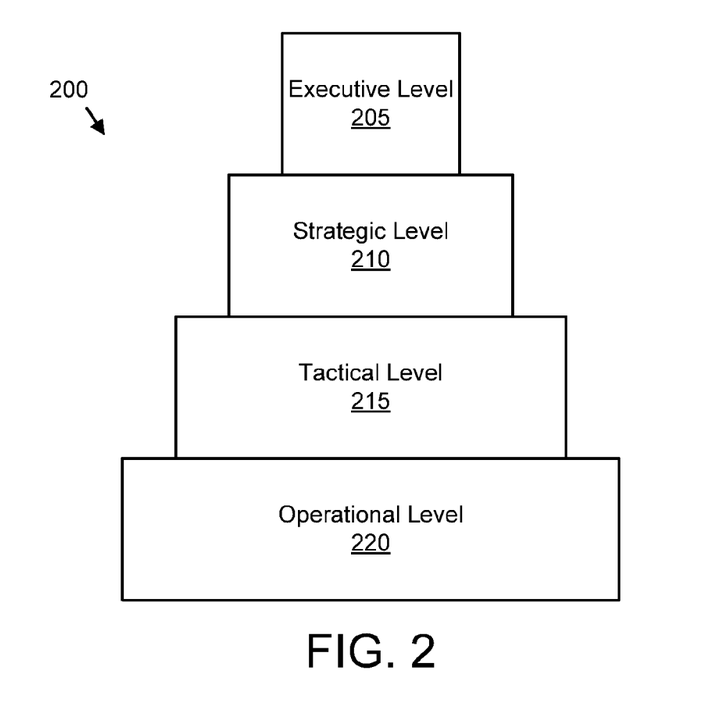
FIG. 2 is a schematic block diagram illustrating one embodiment of an organizational hierarchy.

FIG. 2 is a schematic block diagram illustrating one embodiment of an organizational hierarchy 200. The hierarchy 200 illustrates an organization of levels of management and responsibility for data management functions in an organization such as the organization 100 FIG. 1. The description of the hierarchy 200 refers to elements of FIG. 1, like numbers referring to like elements. The hierarchy 200 includes an executive level 205, a strategic level 210, a tactical level 215, and an operational level 220.

The executive level 205 may include the executive management of the organization 100. The strategic level 210 may include management with responsibility for data functions. The tactical level 215 may include management with direct day-to-day responsibility for data management operations. In addition, the operational level 220 may include employees that implement data management strategies and manage data systems.

Figure 3:
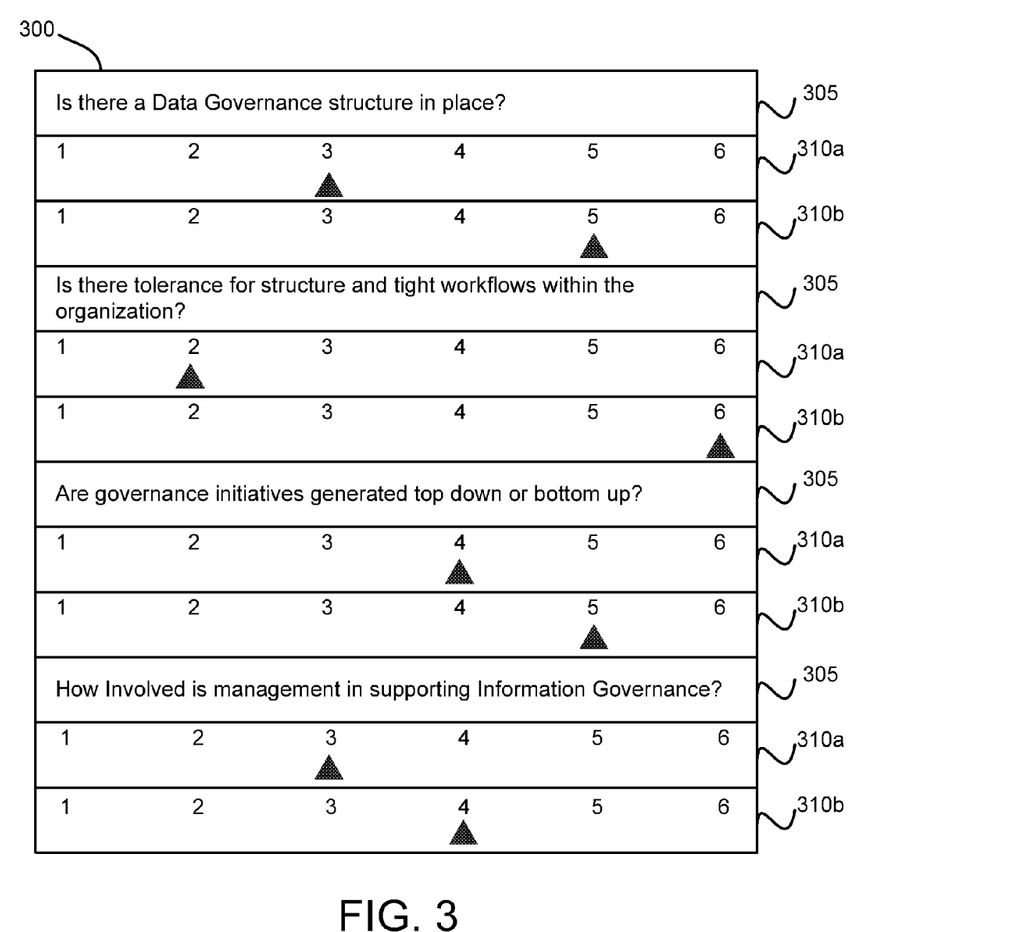
FIG. 3 is a drawing illustrating one embodiment of a questionnaire.

FIG. 3 is a drawing illustrating one embodiment of a questionnaire 300. The questionnaire 300 may be completed by members of the organizational hierarchy 200 of FIG. 2 to assess data governance. The description of the questionnaire 300 refers to elements of FIGS. 1-2, like numbers referring to like elements.

A sub-domain in the questionnaire 300 is a set of questions related to a specific aspect of data governance. Examples include—but are not limited to—the following: Organizational Structure and Awareness, Stewardship, Geography, Business Units, Policies and Procedures, Data Quality Management, Audit Logging and Reporting, Information Security & Privacy and tools.

The questionnaire 300 may include questions 305 and corresponding responses 310. In one embodiment, the questionnaire 300 is automated. For example, the questionnaire 300 may be presented and completed online with responses 310 stored in a database.

The responses 310 may include a current status response 310$a$ and an aspirational response 310$b$. The current status response 310$a$ may indicate the organization's current data governance practices. The aspirational response 310$b$ may indicate the organization's aspirational data governance goals. In the depicted embodiment the responses 310 are organized as sliding scale responses 310. Each response 310 may correspond to a multi-level rating system.

The responses 310 employ a multi-level rating system comprising at least one of a sixth rating level indicative of an in-place data governance structure and integrated business units and data domains, a fifth rating level indicative of the in-place data governance structure and unintegrated business units and data domains, a fourth rating level indicative of no data governance structure and business units and data domains integrated for geographic groups, a third rating level indicative of an in-process data governance structure, a second rating level indicative of an under-consideration data governance structure, and a first rating level indicative of no data governance structure. One of skill in the art will recognize that the multi-level rating system may employ any number of levels with finer and/or coarser distinctions between levels.

Figure 4:
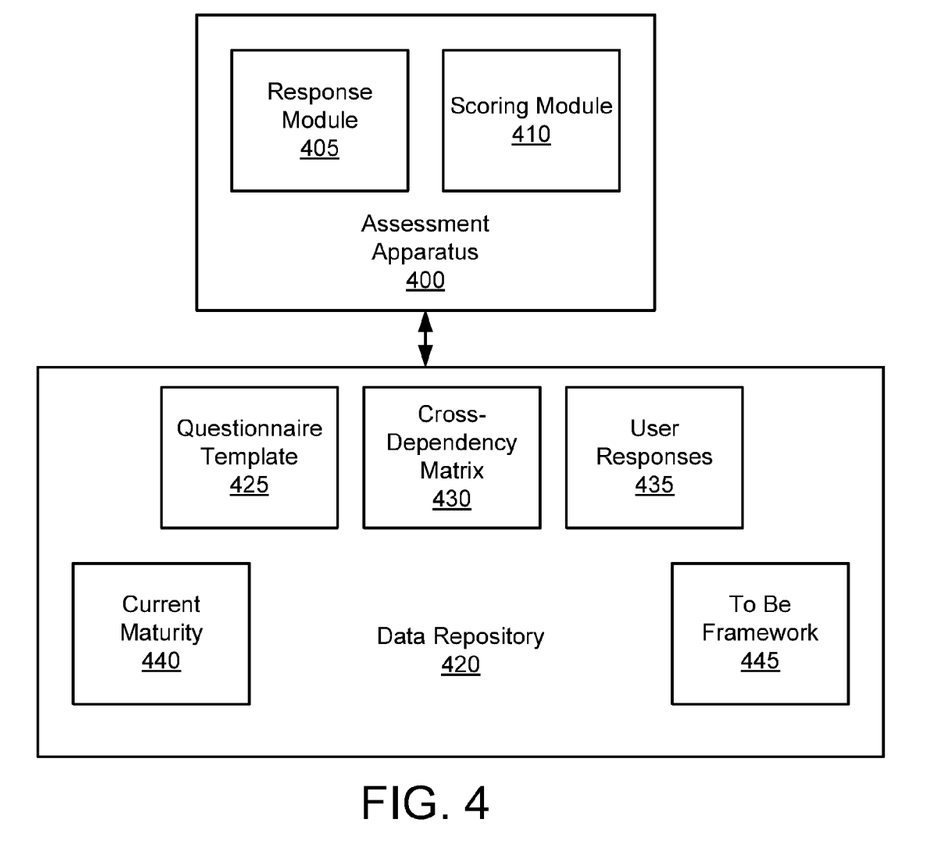
FIG. 4 is a schematic block diagram illustrating one embodiment of an assessment apparatus and data repository.

FIG. 4 is a schematic block diagram illustrating one embodiment of an assessment apparatus 400 and data repository 420. The apparatus 400 and data repository 420 may administer the questionnaire 300 of FIG. 3. In addition, the apparatus 400 and data repository 420 may perform a data governance assessment as will be described hereafter. The description of the apparatus 400 and the data repository 420 refers to elements of FIGS. 1-3, like numbers referring to like elements. The apparatus 400 and the data repository 420 may comprise a computer readable storage medium. The computer readable storage medium may store computer readable program code executable by a processor to perform the embodiments.

A response module 405 may receive responses to an automated questionnaire 300. A scoring module 410 may compute a data governance assessment. The data governance assessment may comprise a maturity level describing organizational adoption of data governance. In addition, the data governance assessment may include a data governance model describing a data centralization level. In one embodiment, the data governance assessment includes a framework describing a tier of data governance. The scoring module 410 may compute the data governance assessment by calculating the maturity level, the data governance model, and the framework from the responses 310 to the questions 305 of the questionnaire 300.

In one embodiment, the data repository 420 comprises a questionnaire template 425, a cross-dependency matrix 430, user responses 435, a current maturity 440, and an aspirational framework 445. The questionnaire template 425 may include the questions 305 of the questionnaire 300. The questions 305 may be organized by subjects. The subjects may comprise a people subject for responses indicative of human involvement data governance, a process subject indicative of data governance processes, and a technology subject indicative of data governance tools.

The cross-dependency matrix 430 may include one or more rules and semantical relationships between questions 305 and sub-domains of the data governance model for determining if the responses 310 are semantically consistent across question areas. The user responses 435 may be organized as a database of responses 310. In one embodiment, the user responses 435 include responses 310 from a plurality of individuals.

The current maturity 440 may store a current data governance assessment for the organization 100 by one or more individuals. The aspirational framework 445 may store an aspirational data governance goal for the organization 100.

Figure 5:
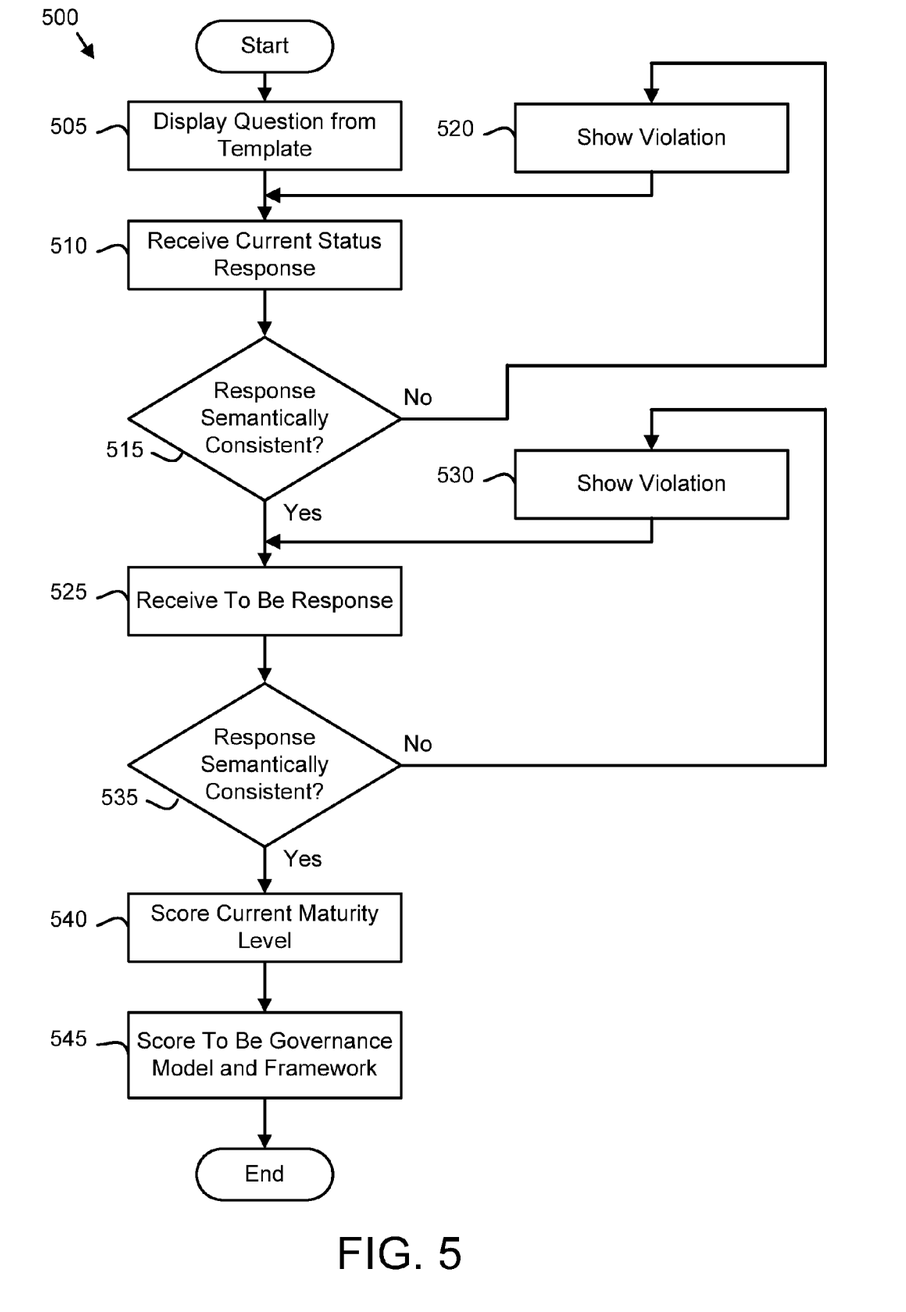
FIG. 5 is a schematic flow chart diagram illustrating one embodiment of a response receiving method.

FIG. 5 is a schematic flow chart diagram illustrating one embodiment of a response receiving method 500. The method 500 may receive responses from one or more individuals that will be used in assessing data governance in the organization 100. The description of the method 500 refers to elements of FIGS. 1-4, like numbers referring to like elements. The method 500 may be performed by a computer readable storage medium storing computer readable program code. In one embodiment, the method 500 may be performed by a processor.

In one embodiment, the method 500 is performed at least once each for a plurality of individuals in the organization 100. The method 500 starts, and in one embodiment, the response module 405 displays 505 a question 305 from the questionnaire template 425. The response module 405 may display 505 a question 305 electronically. In an alternate embodiment, the response module 405 prints 305 questions for physical distribution.

The response module 405 may receive 510 responses 310 to the automated questionnaire 300. In one embodiment, the response module 405 receives 510 a current status response 310a to a question 305. The current status response 310a may be indicative of a current state of the data governance for the organization 100.

The scoring module 410 may determine 515 if the current status response 310a is semantically consistent. In one embodiment, the scoring module 410 uses the predefined rules and semantical relationships between each individual question 305 and the sub-domains of the data governance model stored in a cross-dependency matrix 430 to determine if the responses 310 are semantically consistent.

If the scoring module 410 determines 515 that the current status response 310a is not semantically consistent, the response module 405 may show 520 a violation. In one embodiment, the violation is displayed as a notice in the questionnaire 300. In an alternate embodiment, the violation is stored as a data field in the user responses 435. In a certain embodiment, the violation is communicated to an administrator.

In one embodiment, the response module 405 redisplays the question 305 that elicited the semantically inconsistent first current status response 310a. The response module 405 may further receive 510 a second current status response 310a.

If the scoring module 410 determines 515 that current status response 310a is semantically consistent, the response module 405 may receive 525 an aspirational response 310b. The aspirational response 310b may be indicative of a desired state of data governance for the organization 100.

The scoring module 410 may determine 535 if the aspirational response 310b is semantically consistent. In one embodiment, the scoring module 410 uses the predefined rules and semantical relationships between each individual question 305 and the sub-domains of the data governance model stored in a cross-dependency matrix 430 to determine if the aspirational response 310b is semantically consistent.

If the scoring module 410 determines 535 that the aspirational response 310b is not semantically consistent, the response module 405 may show 530 a violation. In one embodiment, the violation is displayed as the notice in the questionnaire 300. For example, within a sub-domain for organizational structure and awareness, there may be questions that indirectly have relationships. If responses 310 indicate an organization has a federated governance model in place, then most likely users will indicate a maturity level of 4, 5, or 6 in response 310 to a question about level of structure and workflow within the organization. If the responses 310 rate structure and workflow a 1, 2, or 3, then the scoring module 410 may determine a discrepancy and may show a violation 530 such as by providing a 'real-time' notification to confirm the rating, since the response for the structure and workflow conflicts with the responses 310 indicating the federated governance model. In an alternate embodiment, the violation is stored as a data field in the user responses 435. In a certain embodiment, the violation is communicated to the administrator.

If the scoring module 410 determines 535 that the aspirational response 310b is semantically consistent, the scoring module 410 may score 540 an individual current maturity level for the organization. In one embodiment, the scoring module 410 scores 540 the individual current maturity level based on the responses of a single individual. The responses of the plurality of individuals may be aggregated as will be described hereafter.

The scoring module 410 may further score 545 an individual aspirational governance model and framework and the method 500 ends. The individual aspirational governance model and framework may be based on the responses of the single individual. The responses of the plurality of individuals may be aggregated as will be described hereafter.

By checking for semantic consistency between responses 310, the method 500 generates responses 310 to the questions 305 of the questionnaire 300 that are consistent and can be reliably processed with other sets of responses 310 from the user responses 435 to generate a consistent data governance assessment.

Figure 6:
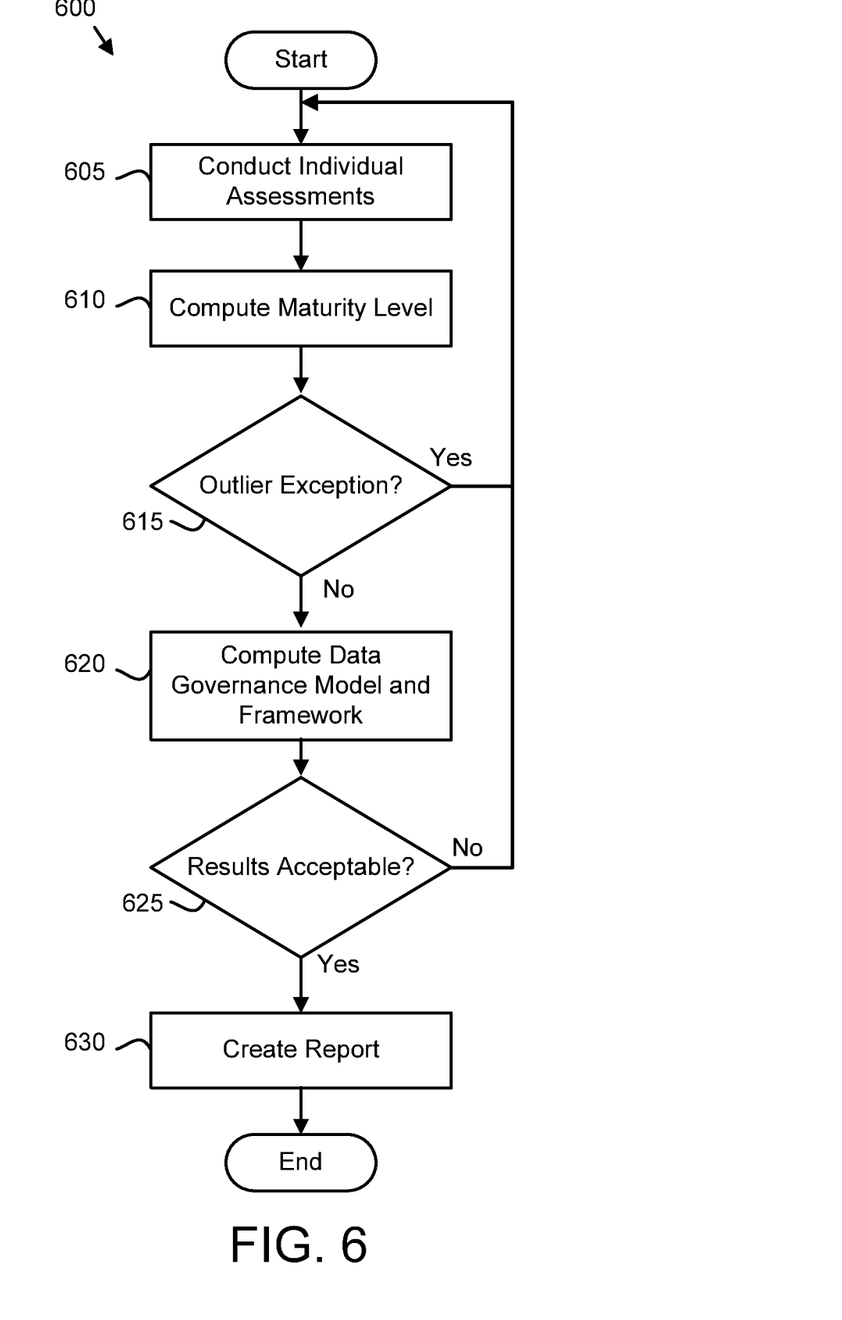
FIG. 6 is a schematic flow chart diagram illustrating one embodiment of a data governance assessment method.

FIG. 6 is a schematic flow chart diagram illustrating one embodiment of a data governance assessment method 600. The method 600 may assess the data governance of the organization 100 using the apparatus 400 of FIG. 4. The description of the method 600 refers to elements of FIGS. 1-5, like numbers referring to like elements. The method 500 may be performed by a computer readable storage medium storing computer readable program code. In one embodiment, the method 500 may be performed by a processor.

The method 600 starts, and in one embodiment, the assessment apparatus 400 conducts 605 individual assessments with each of a plurality of individuals regarding the organization's data governance. The assessment apparatus 400 may conduct 605 individual assessments using the method 500 described in FIG. 5.

In one embodiment, the scoring module 410 computes 610 a maturity level for the organization 100. The maturity level may be computed 610 from the individual current maturity levels scored from the responses 310 of one or more individuals. The maturity level may describe organizational adoption of data governance. The maturity level may be stored as the current maturity 440.

The scoring module 410 may determine 615 if there is an outlier exception among the individual current maturity levels scored from the responses 310. For example, if the individual current maturity levels scored 540 from three individuals are consistent, while an individual current maturity level scored 540 from a fourth individual is not consistent with the other three individual current maturity levels, the scoring module 410 may identify an outlier exception. The assessment apparatus 400 may conduct 605 individual assessments in response to identifying the outlier exception. In one embodiment, the assessment apparatus 400 conducts 605 another individual assessment for the individual generating the outlier exception. Alternatively, the assessment apparatus 400 may conduct 605 new individual assessments for all individuals.

The scoring module 410 may further compute 620 a data governance model and a framework. The data governance model may describe a data centralization level for the organization 100. The data centralization level may comprise a decentralized level with autonomous data governance by geographic groups 110, a federated level with centralized data governance from the enterprise group 105 and autonomous data governance by the geographic groups 110, and a centralized level with centralized data governance for the geographic groups 110 from the enterprise group 105. The data governance model may include a current data governance model and an aspirational data governance model. Embodiments may be practiced with other combinations of the geographic groups 110 and enterprise group 105.

In one embodiment, the data governance assessment includes a framework describing a tier of data governance. The framework may be selected from the group consisting of a four tier level indicative of executive level 205, strategic level 210, tactical level 215, and operational level 220 support for data governance, a three tier level indicative of strategic level 210, tactical level 215, and operational level 220 support for data governance, a two tier level indicative of tactical level 215 and operational level 220 support for data governance, and a one tier level indicative of operational level 220 support for data governance. One of skill in the art will recognize that embodiments may be practiced with other combinations of the executive level 205, strategic level 210, tactical level 215, and operational level 220. The framework may include a current framework and an aspirational framework.

The scoring module 410 may determine 625 if the results of computing the data governance model and framework are acceptable. In one embodiment, the results are acceptable if there is no outlier exception. Alternatively, the results may be acceptable if the data governance model and framework match one of the plurality of standard profiles.

The assessment apparatus 400 may conduct 605 individual assessments if the results are not acceptable. In one embodiment, the assessment apparatus 400 conducts 605 another individual assessment for the individual generating the outlier exception. Alternatively, the assessment apparatus 400 conducts 605 new individual assessments for all individuals.

If the scoring module 410 determines 625 that the results are acceptable, the scoring module 410 may create 630 a report. The report may include the data governance assessment, including the maturity level, the data governance model, the framework. In addition, the report may include responses 310, aggregated responses, and comments from the individuals.

By determining 615 if there is an outlier exception and determining 625 if data governance model and framework results are acceptable, the method 600 increases the quality of the data governance assessment. In addition, the method 600 may automatically create 630 the report that includes the maturity level, the data governance model, and the framework.

Figure 7:
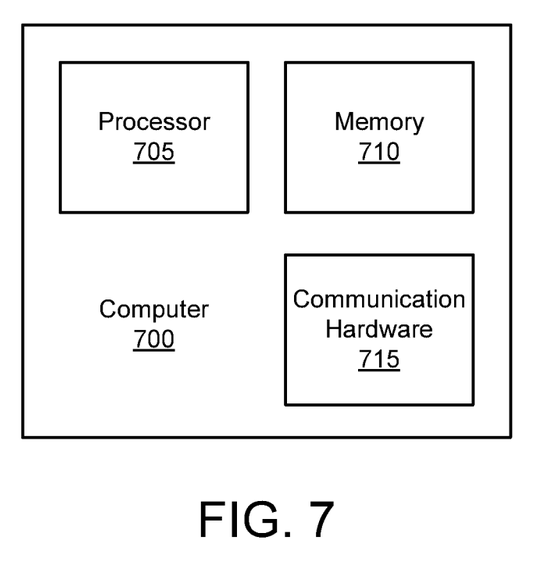
FIG. 7 is a schematic block diagram illustrating one embodiment of a computer.

FIG. 7 is a schematic block diagram illustrating one embodiment of a computer 700. The apparatus 400 and data repository 420 may be embodied in the computer 700. In addition, the computer 700 may perform the methods 500, 600. The computer includes a processor 705, a memory 710, and communication hardware 715. The memory 710 may be a computer readable storage medium. The memory 710 may store computer readable program code. The processor 705 may execute the computer readable program code. The communication hardware 715 may communicate with other devices, an administrator, and/or the individuals participating in the data governance assessment.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for creating a data governance assessment comprising:
receiving, by use of a processor, responses to an automated questionnaire; and
computing a data governance assessment comprising a maturity level describing organizational adoption of data governance, a data governance model describing a data centralization level comprising at least one of a decentralized level, a federated level, and a centralized level, and a framework describing a tier of data governance by calculating the maturity level, the data governance model, and the framework from the responses.

2. The method of claim 1, wherein each response comprises a current status response and an aspirational response.

3. The method of claim 1, the method further comprising determining if the responses are semantically consistent across question areas which have semantical inter-relationships across sub-domains of data governance using pre-defined rules and semantical relationships between each individual question and the sub-domains of the data governance model.

4. The method of claim 3, the method further comprising showing a violation and receiving a second response if a first response is semantically inconsistent.

5. The method of claim 1, wherein responses are received from a plurality of individuals as individual assessments and the method further comprising:
- identifying an outlier individual assessment; and
- repeating at least one individual assessment in response to identifying the outlier individual assessment.

6. The method of claim 1, wherein the responses employ a multi-level rating system comprising at least one of a sixth rating level indicative of an in-place data governance structure and integrated business units and data domains, a fifth rating level indicative of the in-place data governance structure and unintegrated business units and data domains, a fourth rating level indicative of no data governance structure and business units and data domains integrated for geographic groups, a third rating level indicative of an in-process data governance structure, a second rating level indicative of an under-consideration data governance structure, and a first rating level indicative of no data governance structure.

7. The method of claim 1, wherein the decentralized level comprises autonomous data governance for geographic groups, the federated level comprises centralized and autonomous data governance for the geographic groups, and the centralized level comprises centralized data governance for the geographic groups.

8. The method of claim 1, wherein the framework may be selected from at least one of a four tier level indicative of executive, strategic, tactical, and operational support for data governance, a three tier level indicative of strategic, tactical, and operational support for data governance, a two tier level indicative of tactical and operational support for data governance, and a one tier level indicative of operational support for data governance.

9. The method of claim 1, wherein the responses are organized in subjects comprising a people subject for responses indicative of human involvement with data governance, a process subject indicative of data governance processes, and a technology subject indicative of data governance tools.

10. The method of claim 1, wherein the maturity level, the data governance model, and the framework are calculated as sums of products of the responses and a plurality of specified weights.

11. An apparatus comprising:
- a tangible computer readable storage medium storing computer readable program code executable by a processor, the computer readable program code comprising:
- a response module receiving responses to an automated questionnaire; and
- a scoring module computing a data governance assessment comprising a maturity level describing organizational adoption of data governance, a data governance model describing a data centralization level comprising at least one of a decentralized level, a federated level, and a centralized level, and a framework describing a tier of data governance by calculating the maturity level, the data governance model, and the framework from the responses.

12. The apparatus of claim 11, the scoring module further determining if the responses are semantically consistent across question areas which have semantical inter-relationships across sub-domains of data governance using pre-defined rules and semantical relationships between each individual question and the sub-domains of the data governance model.

13. The apparatus of claim 12, the response module further showing a violation and receiving a second response if a first response is semantically inconsistent.

14. The apparatus of claim 11, wherein the responses employ a multi-level rating system comprising at least one of a sixth rating level indicative of an in-place data governance structure and integrated business units and data domains, a fifth rating level indicative of the in-place data governance structure and unintegrated business units and data domains, a fourth rating level indicative of no data governance structure and business units and data domains integrated for geographic groups, a third rating level indicative of an in-process data governance structure, a second rating level indicative of an under-consideration data governance structure, and a first rating level indicative of no data governance structure.

15. The apparatus of claim 11, wherein the responses are organized in subjects comprising a people subject for responses indicative of human involvement with data governance, a process subject indicative of data governance processes, and a technology subject indicative of data governance tools.

16. A computer program product for data governance assessment, the computer program product comprising:
- a tangible computer readable storage medium having computer readable program code embodied therein, the computer readable program code configured to:
- receive responses to an automated questionnaire; and
- compute a data governance assessment comprising a maturity level describing organizational adoption of data governance, a data governance model describing a data centralization level comprising at least one of a decentralized level, a federated level, and a centralized level, and a framework describing a tier of data governance by calculating the maturity level, the data governance model, and the framework from the responses.

17. The computer program product of claim 16, the computer readable program code further configured to determine if the responses are semantically consistent across question areas which have semantical inter-relationships across sub-domains of data governance using pre-defined rules and semantical relationships between each individual question and the sub-domains of the data governance model and show a violation and receive a second response if a first response is semantically inconsistent.

18. The computer program product of claim 16, wherein responses are received from a plurality of individuals as individual assessments and the computer program code is further configured to:
- identify an outlier individual assessment; and
- repeat at least one individual assessment in response to identifying the outlier individual assessment.

19. The computer program product of claim 16, wherein the responses employ a multi-level rating system comprising at least one of a sixth rating level indicative of an in-place data governance structure and integrated business units and data domains, a fifth rating level indicative of the in-place data governance structure and unintegrated business units and data domains, a fourth rating level indicative of no data governance structure and business units and data domains integrated for geographic groups, a third rating level indicative of an in-process data governance structure, a second rating level indicative of an under-consideration data governance structure, and a first rating level indicative of no data governance structure.

20. The computer program product of claim 16, wherein the maturity level, the data governance model, and the framework are calculated as sums of products of the responses and a plurality of specified weights.

21. A method for integrating a computer program product, comprising integrating computer readable program code into a tangible computing system, wherein the code in combination with the computing system performs the following:

receiving responses to an automated questionnaire; and computing a data governance assessment comprising a maturity level describing organizational adoption of data governance, a data governance model describing a data centralization level comprising at least one of a decentralized level, a federated level, and a centralized level, and a framework describing a tier of data governance by calculating the maturity level, the data governance model, and the framework from the responses.

22. The method of claim 21, the method further determining if the responses are semantically consistent across question areas which have semantical inter-relationships across sub-domains of data governance using pre-defined rules and semantical relationships between each individual question and the sub-domains of the data governance model.

23. The method of claim 22, the method further comprising showing a violation and receiving a second response if a first response is semantically inconsistent.

24. The method of claim 21, wherein responses are received from a plurality of individuals as individual assessments and the method further comprising:

identifying an outlier individual assessment; and repeating at least one individual assessment in response to identifying the outlier individual assessment.

25. The method of claim 21, wherein the responses employ a multi-level rating system comprising at least one of a sixth rating level indicative of an in-place data governance structure and integrated business units and data domains, a fifth rating level indicative of the in-place data governance structure and unintegrated business units and data domains, a fourth rating level indicative of no data governance structure and business units and data domains integrated for geographic groups, a third rating level indicative of an in-process data governance structure, a second rating level indicative of an under-consideration data governance structure, and a first rating level indicative of no data governance structure.

* * * * *